No. 791,551. PATENTED JUNE 6, 1905.
W. S. HALBERT.
COUPLING.
APPLICATION FILED FEB. 17, 1905.

WITNESSES.
Nora Graham
Fay Graham

INVENTOR
WALTER S. HALBERT.
by S. P. Graham
his attorney.

No. 791,551.

Patented June 6, 1905.

UNITED STATES PATENT OFFICE.

WALTER S. HALBERT, OF WESTVILLE, ILLINOIS.

COUPLING.

SPECIFICATION forming part of Letters Patent No. 791,551, dated June 6, 1905.

Application filed February 17, 1905. Serial No. 246,192.

*To all whom it may concern:*

Be it known that I, WALTER S. HALBERT, of Westville, in the county of Vermilion and State of Illinois, have invented certain new and useful Improvements in Couplings, of which the following is a specification.

This invention is particularly applicable to the hitches or couplings of coal-cars, in which it constitutes the coupling-link; but it may be used wherever a detachable coupling is desired and a certain degree of side swing in one of the members is obtainable.

The object is to provide a simple and secure coupling which may be readily uncoupled by intelligent manipulation. The invention is exemplified in the structure hereinafter described, and it is defined in the appended claims.

Figure 1:
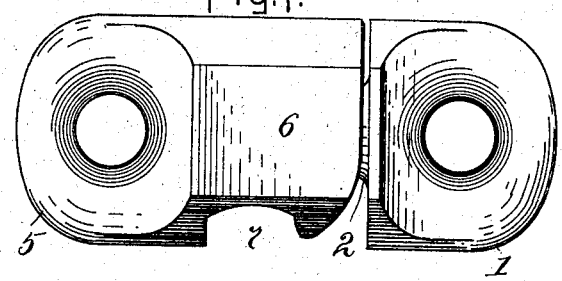
Figure 2:
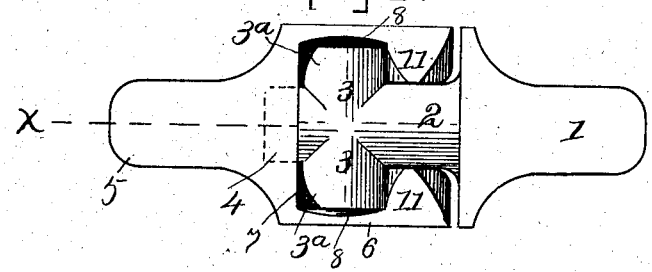
Figure 3:
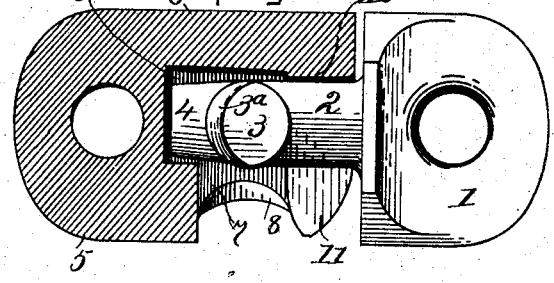
Figure 4:
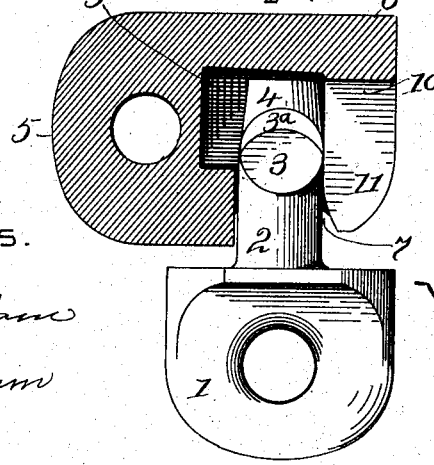

In the drawings forming part of this specification, Figure 1 is a plan of a coupling embodying my invention. Fig. 2 is a side elevation of the coupling. Fig. 3 is a plan of the male member of the coupling with the female member shown in section; and Fig. 4 is the same as Fig. 3 except that in Fig. 3 the parts of the coupling are extended as in use, while in Fig. 4 the male member is swung sidewise preparatory to breaking or disconnecting the coupling.

The male member of the coupling comprises a cross, as 2 3 3 4, to the base of which an eye or ring, as 1, is secured. The cross-arms 3 constitute the engaging parts of the male member. The extension 4 prevents uncoupling while the two members are held in line, or approximately so, and the body 2 of the cross acts as a draft-bar or link. The eye 1 provides a hitch-bearing for a link or draw-bar of the coal-car or other appliance on which the coupling may be used. The flattened side of the eye is adapted to abut against an end of the female member of the coupling somewhat like a buffer.

The female member of the coupling comprises a hollow body 6, having an eye 5 at one end. The end of the body 6 opposite the eye 5 is slotted at 10 to admit the body 2 of the cross-formed male member, and a side of the body 6 has an opening 7 wide enough to admit the cross-arms 3. The cavity 9 of the female member extends beyond the side opening 7 and forms a recess into which extension 4 of the cross projects while the parts are coupled together. The greater width of opening 7 as compared with slot 10 forms the ledges 11 at the coupling end of body 6, and the cross-arms bear against these ledges. The ledges extend at approximately right angles with the line of draft, and they constitute the stress-sustaining elements of the female member. The opening 7 and the ends of the cross-arms are preferably beveled, as shown at 8 and at 3ª, respectively, in order to facilitate the insertion of the male member.

A coupling is effected by turning the two members at about right angles with each other, inserting the cross-formed male member through side opening 7, and then turning the member until the part 2 of the male member rests in the slot 10, the cross-arms engage the ledges 11, and the extension 4 projects into the far end of cavity 9. Force exerted on the eyes 1 and 5 in opposite directions tends to hold the members in alinement. Separation of the parts while in use is effectually prevented by the extension 4 and the housing therefor. When the male member is swung into the position shown in Fig. 4, the extension 4 is clear of its housing, and the parts may be easily separated by drawing the cross-arms out through opening 7.

Having thus described my invention, I claim as new and desire to secure by Letters Patent—

1. In a coupling, the combination of a cruciform male member, and a hollow female member having a side opening for insertion of the cross-arms, a slotted end for the body of the cross and a recess for the head of the cross, substantially as described.

2. In a coupling, the combination of a cruciform male member having an eye at its base, and a hollow female member having an eye at one end, a slot through the opposite end, a side opening wider than the slot and a recess extending from the side opening toward the eye, substantially as described.

In testimony whereof I sign my name in the presence of two subscribing witnesses.

W. S. HALBERT.

Witnesses:
JOHN ROYCE,
GILBERT RAMSEY.